United States Patent [19]

Maniscalco et al.

[11] 4,344,911
[45] Aug. 17, 1982

[54] FLUIDIZED WALL FOR PROTECTING FUSION CHAMBER WALLS

[75] Inventors: James A. Maniscalco, Danville; Wayne R. Meier, Livermore, both of Calif.

[73] Assignee: The United States of America as represented by the United States Department of Energy, Washington, D.C.

[21] Appl. No.: 88,222

[22] Filed: Oct. 25, 1979

Related U.S. Application Data

[63] Continuation of Ser. No. 851,331, Nov. 14, 1977, abandoned.

[51] Int. Cl.³ .............................................. G21B 1/00
[52] U.S. Cl. .................................. 376/102; 376/146; 376/150; 376/904
[58] Field of Search ........................ 176/1, 4, 9, 3, 49; 376/103, 102, 150, 904, 146

[56] References Cited

U.S. PATENT DOCUMENTS

| | | | |
|---|---|---|---|
| 3,009,866 | 11/1961 | Fraas et al. | 176/49 |
| 3,624,239 | 11/1971 | Fraas | 176/9 |
| 3,708,391 | 1/1973 | Christofilos | 176/4 |
| 3,723,246 | 3/1973 | Lubin | 176/1 |
| 3,762,992 | 10/1973 | Hedstrom | 176/1 |

OTHER PUBLICATIONS

ANL/CTR/TM-44, 6/75, pp. 1–26, Kot.
ANS Trans., 6/75, vol. 21, pp. 18, 19.
ANS Trans., 6/12–16/77, pp. 64–69.
Scientific American, 6/71, vol. 224, No. 6, pp. 21–33, Lubin et al.
EN G-CTR-TM-31, 11/74, pp. 1–12, Burke.
ANS Trans., vol. 21, 6/75, pp. 49–54.
UWFDM-190, 12/76, pp.(VI-A-1)–(VI-A-7), (VI-B-1)–(VI-B-3), (VI-C-1)–(VI-C-4), (VI-C-15)–(VI-C-18), (VI-E-1)–(VI-E-6).

Primary Examiner—Harvey E. Behrend
Attorney, Agent, or Firm—L. E. Carnaham; Roger S. Gaither; James E. Denny

[57] ABSTRACT

Apparatus for protecting the inner wall of a fusion chamber from microexplosion debris, x-rays, neutrons, etc. produced by deuterium-tritium (DT) targets imploded within the fusion chamber. The apparatus utilizes a fluidized wall similar to a waterfall comprising liquid lithium or solid pellets of lithium-ceramic, the waterfall forming a blanket to prevent damage of the structural materials of the chamber.

9 Claims, 12 Drawing Figures

FLUIDIZED WALL FOR PROTECTING FUSION CHAMBER WALLS

BACKGROUND OF THE INVENTION

The invention described herein was made at the Lawrence Livermore Laboratory in the course of, or under, Contract No. W-7405-ENG-48 between the University of California and the United States Department of Energy (formerly the United States Energy Research and Development Administration).

This is a continuation of application Ser. No. 851,331, filed Nov. 14, 1977, now abandoned.

This invention relates to inertial fusion systems and particularly to means for protecting inner structural components of such inertial fusion systems from the x-rays, neutrons, plasma, shock effects, etc. produced by implosion of fusion targets therein.

For decades, efforts have been carried out to utilize fusion energy as a source of useful power. Fusion energy should: (1) be an abundant source, (2) be safe, (3) be compatible with the environment, and (4) be technically and economically feasible. Inasmuch as estimated reserves of fusion fuel sources appear to provide the capability of supplying projected electrical energy needs for several hundred years, thus satisfying item 1, efforts have been directed to satisfying items 2–4. Early and currently ongoing efforts are directed to the production of fusion power by the magnetic confinement approach, with more recent efforts also being directed to the inertial confinement approach.

With the advent of lasers, early inertial confinement efforts have been directed to the development of laser initiated fusion power plants, as exemplified by U.S. Pat. Nos. 3,624,239 issued Nov. 30, 1971 to A. P. Fraas; 3,723,246 issued Mar. 27, 1973 to M. J. Lubin; and 3,762,992 issued Oct. 2, 1973 to J. C. Hedstrom, wherein a fuel containing target is injected into an implosion or combustion chamber and imploded by one or more laser beams directed into the chamber.

More recently, development efforts have also been directed to utilizing ion and electron beams for imploding fusion targets within a chamber, as exemplified by U.S. Pat. Nos. 3,892,950 issued July 1, 1975 to J. R. Freeman et al; and 3,899,681 issued Aug. 12, 1975 to E. H. Beckner et al.

With the experimental verification in 1974 and 1975 of the production of neutrons, x-rays, etc. by the implosion of tiny fusion fuel targets via inertial confinement, and with the verification in 1976 that the neutrons thus produced were indeed thermonuclear, efforts have been substantially increased in the field of inertial fusion reactor development. As the result of the experimental efforts in producing fusion neutrons from the tiny targets, it was found that implosion of such resulted in very little damage to the wall surfaces, etc. of the implosion or combustion chamber. However, it is recognized that implosion of larger targets at a selected repetition rate will be necessary to produce useful power by inertial confinement systems, and thus means must be developed to protect the implosion chamber from the x-rays, high-energy neutrons, etc., produced by the implosion of these larger or higher yield targets.

At the presently contemplated values of $\rho R$ (=product of final density and final radius of the imploded fusion target) of 1–2 for laser fusion experiments, approximately 75% of the fusion energy thus produced is in the form of high energy neutrons, with the remainder being primarily x-rays and target debris. A neutron moderating material is thus required to convert neutron kinetic energy to thermal energy. Lithium has been considered as such a moderating material, as exemplified by above-referenced U.S. Pat. No. 3,624,239. A DT fusion reactor must also breed its own tritium, and the only tritium-producing reactions with sufficiently high cross sections to be useful are those involving lithium:

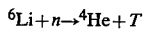

$^6\text{Li} + n \rightarrow {}^4\text{He} + T$

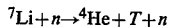

$^7\text{Li} + n \rightarrow {}^4\text{He} + T + n$

To obtain a T breeding ratio >1.0, the $^7\text{Li}$ reaction is required to offset unavoidable neutron losses; this reaction produces a tritium atom without depleting the neutron population, although said reaction has an energy threshold of 4 MeV and a much lower reaction cross section than the $^6\text{Li}$ reaction.

At the same time, it is also necessary to protect the first exposed wall in the interior of the fusion chamber from the debris, x-rays, and high energy neutrons (approximately 25% of the total energy) produced by each microexplosion.

To accomplish the protection of the chamber, the breeding of its own tritium, and the dissipation of the heat produced by the conversion of neutron kinetic energy, the so-called "wetted wall" approach has been proposed, as exemplified by above-referenced U.S. Pat. No. 3,762,992, utilizing liquid lithium. The so-called "dry wall" approach has been proposed wherein a sacrificial metal or ceramic liner is placed between the fusion chamber and the blanket which interacts with the x-rays and debris. In addition, the so-called magnetically protected wall uses a solenoid to divert the pellet debris away from the wall into collectors.

While these prior approaches have been calculated to provide adequate protection from x-rays and debris, the structures are still subject to damage from high energy neutrons, and only for a period of time, possibly as long as 1–3 years. A need exists by which structural wall protection can be accomplished more effectively and more economically.

SUMMARY OF THE INVENTION

The invention is directed to means for protecting the first or inner wall of an inertial fusion implosion chamber from high energy neutrons, x-rays, charged particles, and debris produced by the implosion of fusion fuel targets in the chamber, as well as providing a neutron moderating material to convert neutron kinetic energy to thermal energy, and for breeding tritium. This is accomplished in accordance with the invention by providing a blanket within the chamber which utilizes a fluidized wall similar to a waterfall composed of liquid or lithium or of solid pellets of lithium-ceramic. Calculations indicate that the lithium waterfall approach will provide adequate protection of the chamber for about 30 years.

Therefore, it is an object of this invention to provide means for protecting the first wall of a fusion chamber from x-rays, neutrons, etc. created by implosion of a fusion fuel target therein.

A further object of the invention is to provide in a fusion reaction chamber a blanket which utilizes a fluidized wall for protecting the inner surface of the chamber.

Another object of the invention is to provide means for the protection of the inner components of a fusion reaction chamber from x-rays, neutrons, etc. while providing for tritium breeding and for conversion of neutron kinetic energy to thermal energy.

Another object of the invention is to provide a lithium waterfall blanket for use in laser fusion implosion chambers.

Other objects of the invention will become readily apparent from the following description and accompanying drawings.

DETAILED DESCRIPTION OF THE BEST MODE CONTEMPLATED

Figure 1:
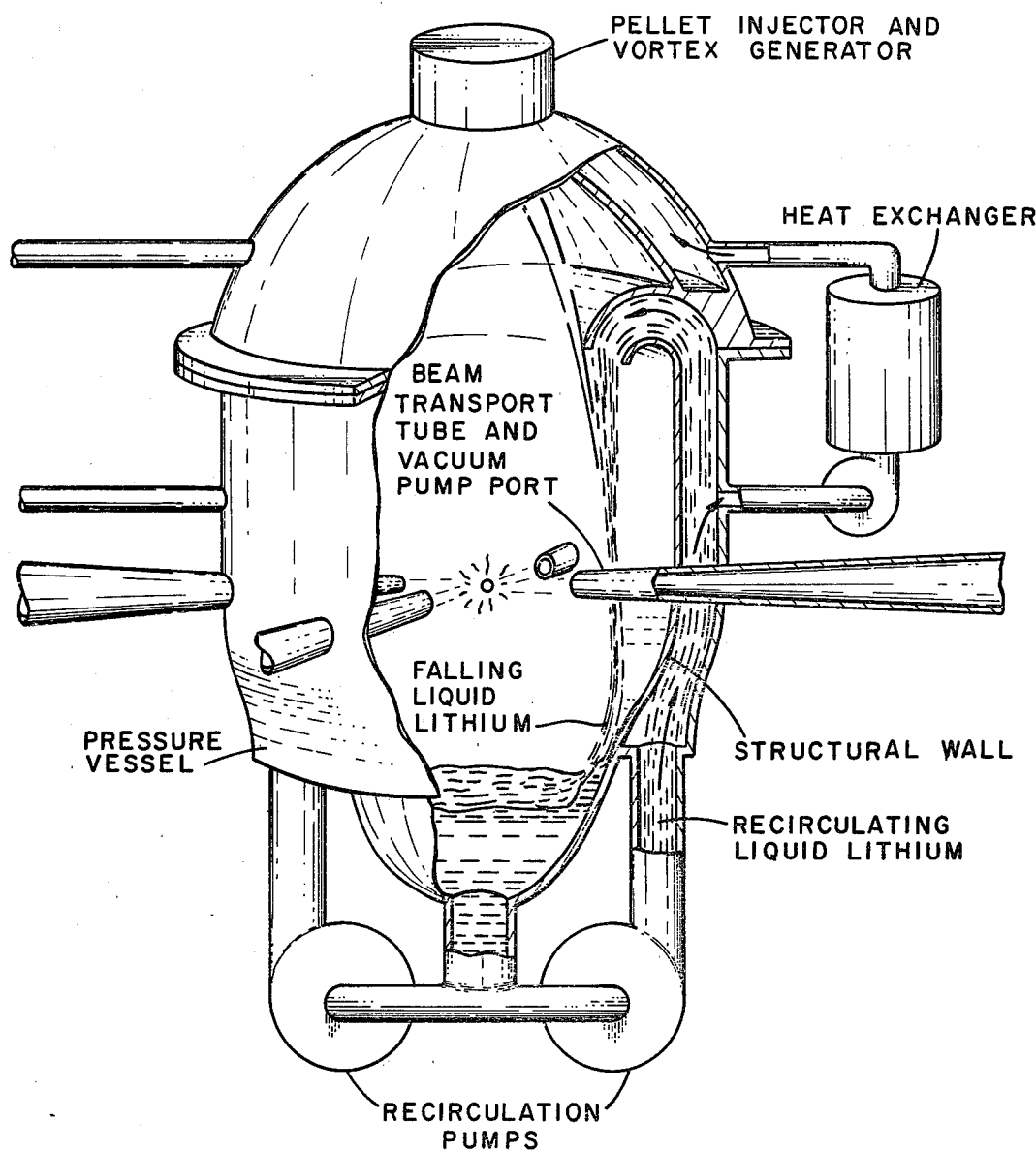
FIG. 1 is a view, partially in cross-section, of an embodiment of a laser fusion reactor utilizing a liquid lithium waterfall or fluidized wall in accordance with the invention.

The present invention provides for the protection of the first or inner wall of an inertial confinement fusion chamber from neutrons, x-rays, plasma, charged particles, debris, etc. generated by the implosion of a fusion target within the chamber. This protection is provided by the use of a fluidized wall or waterfall within the chamber in the form of liquid lithium or of solid pellets of lithium-ceramic. The waterfall contains sufficient neutron moderating material to degrade the fusion neutron spectrum to the point where neutron damage levels in structural materials are sufficiently low to allow use of smaller blanket structures which could last the lifetime of the fusion chamber (~30 years). Thus, the fluidized wall approach of this invention has the capability of coping with the problems of 14 MeV neutron damage and cyclical stresses.

The principle feature of the invention is a thick continuously recyclable first-wall of fluidized material such as a lithium waterfall. On each shot the waterfall is in effect disassembled; between each shot it is reestablished. The lithium (liquid or pellets) is continuously pumped to the top of the evacuated fusion chamber through a reservoir region which separates the first-wall from the pressure vessel, and the waterfall is spaced from the surface of the first-wall to eliminate any shock effects produced by energy from the exploding target stricking the lithium wall. A small fraction of the lithium in the waterfall and reservoir regions is circulated to a heat exchanger which in turn transfers heat to a steam generation cycle. The lithium waterfall thus serves as the primary coolant, neutron moderator, and the fertile material for tritium breeding.

Two of the major reactor vessel problems affecting the technical feasibility of a laser fusion power plant are, as pointed out above:

1. The effects of high-energy neutrons and cyclical stresses on the blanket structure.
2. The effects of x-rays and debris from the fusion microexplosion on the first-wall of the fusion chamber.

The reactor concepts that have been developed (and are being assessed in terms of factors including reactor size, power density, first-wall and blanket lifetimes, duty cycle, fabrication costs, stored energy requirements, and recirculating power fractions) include:

1. A liquid-lithium-cooled stainless steel manifold.
2. A gas-cooled graphite manifold.
3. Fluidized wall of this invention, such as a liquid lithium "waterfall", and a ceramic-lithium pellet "waterfall". For a more complete description of these first two reactor concepts, though briefly described hereinafter, reference is made to report UCRL-79654 by W. R. Meier et al entitled "Reactor Concepts for Laser Fusion", dated July 1977, prepared for submission to the proceedings of the American Institute of Chemical Engineers, Nov. 13–17, 1977, New York, N.Y.

Prior to describing the fluidized wall (liquid or pellet) some background information on fusion reactor technology and the design parameters and constraints that are common to all of the reactor systems will be set forth. This discussion of reactor technology deals primarily with the functions that a blanket system is required to perform and the problems associated with performing these functions in the hostile environment created by the fusion microexplosion.

All of the reactor concepts here considered are based on an inertially confined deuterium-tritium fusion reaction. We have selected thermonuclear yields ranging from 400 to 4000 MJ and pulse repetition rates from 1 to 10 Hz for the basis of discussion. Selected combinations of these parameters result in reactor systems that produce 400 to 4000 MW of thermal power and 120 to 1500 MW of electrical power with net efficiencies ranging from 30 to 40%. The variance in net efficiency results from the different thermal efficiencies and recirculating power requirements of the various concepts. The selected parameter space for fusion neutron flux at the first wall ranges from 1 to 10 MW/m$^2$, resulting in first wall radii ranging from 1.5 to 15 m.

The effects of neutrons, x-rays, and debris from the thermonuclear microexplosion represent the primary technical concerns that must be dealt within laser-fusion reactor concepts. All of our reactor concepts considered here employ large focal length optics to mitigate the damaging effects to the final focusing elements. At the focal length of 10 m the final optics would survive the microexplosions, but may have to be replaced at relatively short intervals. At longer focal lengths (~100) the damaging effects may be greatly reduced, thus assuring the survival of the final focusing elements for intervals that are long enough not to affect adversely the plant capacity factor. High-energy neutrons also damage and activate most structural materials. The large amounts of radioactive waste thus generated represent a maintenance and disposal problem that is common to all types of DT fusion systems. X-ray and debris damage to first-wall materials is a problem primarily associated with inertial confinement fusion systems.

Several different approaches to the first-wall problem have been discussed in the literature, including use of a dry wall, wetted wall, and magnetically protected wall as indicated above. These approaches differ primarily in the way in which the inner surface of the first wall interacts with the x-rays and microexplosion debris. In the dry wall approach a sacrificial metal or ceramic liner is placed between the fusion chamber and the blanket. The wetted wall concepts feature a thin layer of liquid metal that covers the metal wall and protects it from the blistering and structural ablation that would otherwise occur. The magnetic protection concept uses a solenoid to divert the pellet debris away from the sides of a cylindrical blanket and into conical collectors at the top and bottom.

The fluidized wall approach of this invention is a promising approach which has been developed. In this approach, the first structural wall is shielded from x-rays, neutrons, plasma and shock effects by a thick falling region of lithium in liquid or solid pellet form. The fall (fluidized wall) will contain enough moderating material to degrade the fusion neutron spectrum to the point where neutron damage levels in structural materials are low enough to allow us to consider smaller blanket structures which could last for the useful lifetime of the plant (~30 years).

The blanket system must perform several functions while coping with the hostile environment created by the fusion microexplosion. It must:

1. Convert the fusion energy into thermal energy.
2. Provide for efficient removal of the thermal energy.
3. Breed enough tritium to replace that which was burned in the fusion reaction.
4. Maintain the required vacuum in the fusion chamber.

Sixty-five to seventy-five percent of the fusion energy is in the form of high-energy neutrons. Therefore, a neutron-moderating material is required to convert kinetic energy to thermal energy. In general, elements with low atomic numbers and high scattering cross sections are effective moderators; water, hydrides, beryllium, and graphite are common examples. Although somewhat less effective, lithium can also be considered as a neutron-moderating material.

Because there is no significant natural supply of tritium, as pointed out above, a DT fusion reactor must breed its own tritium. Several neutron reactions produce tritium, but the only tritium-producing reactions with high enough cross sections to be useful are those involving lithium:

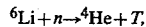

$^6Li + n \rightarrow {}^4He + T,$

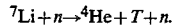

$^7Li + n \rightarrow {}^4He + T + n.$

The $^7Li$ reaction has a threshold of approximately 4 MeV and a much lower cross section than the $^6Li$ reaction; nevertheless, it is very important because it produces a T atom without depleting the neutron population. If the neutrons are moderated before reaching the fertile lithium, the $^7Li$ reaction is not utilized (since it requires a high-energy neutron) and any lost neutrons would result in a tritium-breeding ratio less than 1.0. In such cases, the blanket may also require some sort of neutron multiplier to maintain an adequate breeding ratio. Beryllium and lead with high (n, 2n) and low capture cross sections are examples of good neutron multipliers. However, beryllium is an example of a limited resource material whose use could significantly reduce fusion's potential as a long-range source of energy.

The vacuum requirements in the fusion chamber are primarily determined by considerations of laser beam propagation and damage to the injected fuel pellet. If the DT fuel can be incorporated into the pellet in a noncryogenic or insulated form, and hence be less subject to heat damage, laser beam propagation will be the primary factor determining the vacuum requirements in the fusion chamber. Our computer calculation results indicated that beam defocusing and attenuation of 1 $\mu m$ light by cascade breakdown and/or thermal blooming can be reduced to acceptable levels with fusion chamber pressures of 0.1 torr or less. The pumping requirements needed to maintain this vacuum will depend on the material vaporized and the type of pump used. For a lithium wetted first-wall concept, the 0.1-torr vacuum can be maintained under the worst conditions with a pump that requires about 2% of the gross electrical power and approximately 10% of the surface area (the worst conditions resulting when all the debris and x-ray energy is used to vaporize lithium).

In the above-mentioned liquid-lithium-cooled stainless steel manifold approach, the microexplosion is surrounded by a cylindrical annulus of stainless steel into which vertical coolant channels have been drilled to form a manifold. Liquid lithium flows down through these channels and is recirculated to the top through a bulk coolant region, which separates the annular manifold from an outer pressure vessel. Liquid lithium serves as the primary coolant, as a neutron moderator, and as the fertile material. The stainless steel manifold concept is compatible with either the dry or wetted first-wall approach. In the dry-wall approach a graphite liner would be supported by the stainless steel and cooled by liquid lithium; while in the wet-wall approach a thin (3 mm) film of liquid lithium on the inner surface of the manifold would be used. However, tritium-breeding considerations limit the thickness of a structural wall of solid stainless steel to 10 cm or less, and which would require internal cooling. Computer calculations indicate cyclical stresses and neutron damage will limit the lifetime of the liquid manifold to a few full-power years.

The above-mentioned gas-cooled graphite manifold approach is similar to the stainless steel manifold concept except that the vertical coolant channels are drilled into an array of graphite blocks that make up the fusion chamber. The vacuum vessel is an outer shell of reinforced, prestressed concrete. High-pressure helium gas is pumped through the coolant channels, some or all of which are filled with pellets of a lithium-bearing ceramic. Tritium is removed from these channels by the gas coolant as it diffuses out of the lithium compound in which it is bred. This approach exhibits low activation and low tritium inventories. Moreover, the possibility of an accident occurring that could release radioactivity to the environment is greatly reduced because the lithium is present in a solid less reactive form ($Li_2O$, $LiAl_2O_3$). The graphite moderates the neutrons below activation energy levels. It also moderates the neutrons to energies below the threshold for the $^7Li$ tritium-producing reaction. This makes it advantageous to enrich the lithium in $^6$Li, thereby reducing the required lithium and tritium inventories. However, without the tritium-breeding contribution from $^7$Li, a neutron multiplier, such as beryllium, may be required to maintain a tritium-breeding ratio greater than 1. The use of beryllium to multiply neutrons and enhance tritium-breeding presents a problem in terms of beryllium's toxicity and relative scarcity. The use of a gas coolant will allow high operating temperatures and result in high thermal conversion efficiencies. Large amounts of pumping power will be required for cooling the system and purging the tritium from the pellet-filled channels. Finally, the structural integrity of the graphite chamber in the microexplosion environment may be inadequate.

An embodiment of the fluidized wall approach of this invention is illustrated in FIG. 1 wherein the blanket is formed with the implosion chamber by recirculating lithium as indicated by the arrows, and as mentioned above, a portion of the heated lithium is passed through a heat exchanger arrangement for operation of an associated steam cycle system, as known in the art. Note that the lithium blanket is spaced from the wall surface of the chamber.

While FIG. 1 illustrates a liquid lithium "waterfall" embodiment of the invention, described in greater detail hereinafter, a ceramic-lithium pellet "waterfall" embodiment also constitutes part of the invention fluidized wall approach to solving the above-identified two major reactor vessel problems.

It has been demonstrated in the nuclear fission industry that once scientific feasibility has been achieved, the materials development program paces the demonstration of technical and economic feasibility. Fluidized wall concepts will be less dependent on materials development because radiation damage is significantly reduced. The analysis of the liquid lithium system is further facilitated by the availability of data on the properties of liquid lithium and the existence of liquid-metal experimental facilities built in support of the liquid-metal fast breeder reactor (LMFBR) program.

Figure 2:
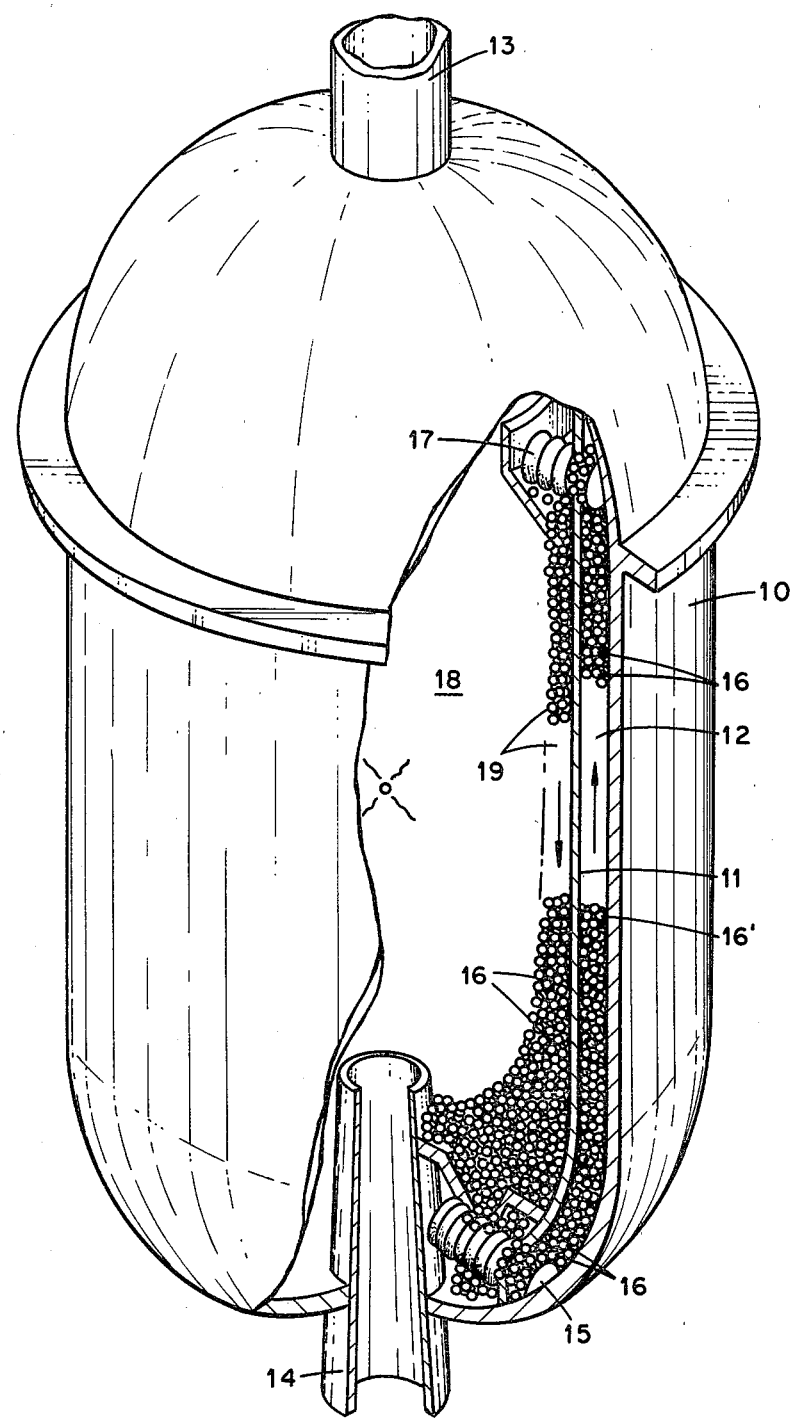
FIGS. 2 and 3 illustrate an embodiment of a fusion chamber, partially in cross-section, using a lithium fluidized wall or blanket composed of solid pellets in accordance with the invention.
Figure 3:
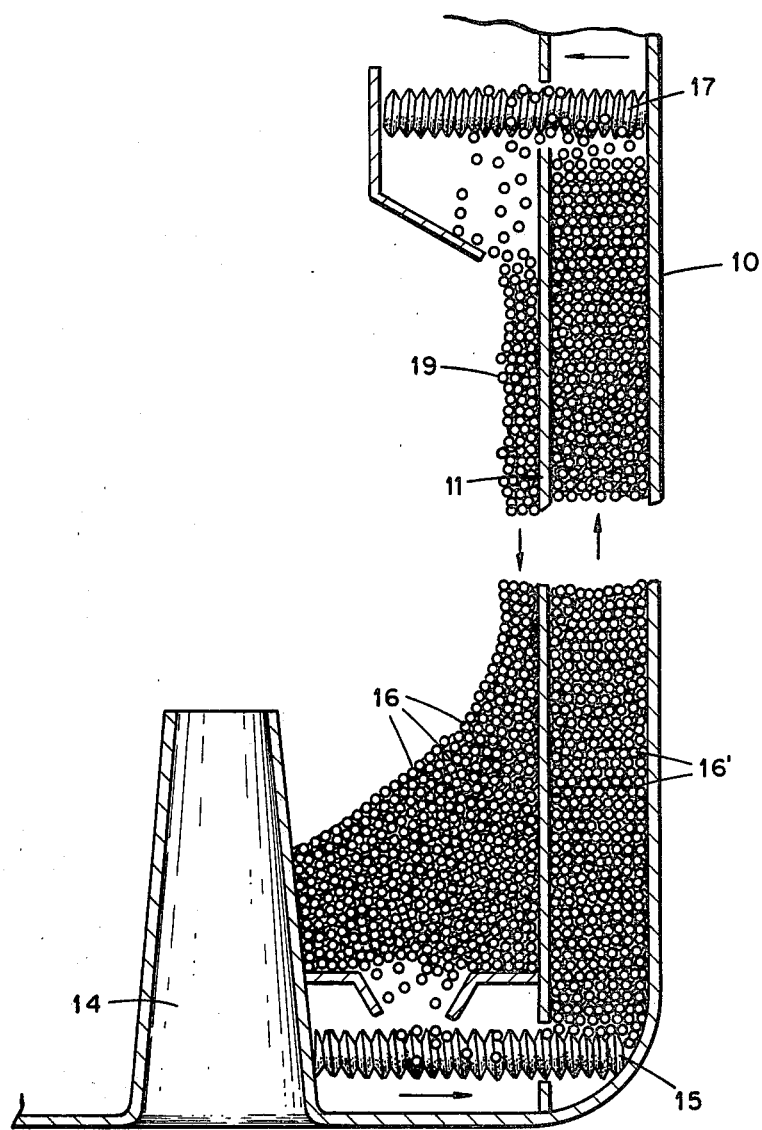

Referring now to the embodiment of the invention illustrated in FIGS. 2 and 3 and basically comprises a cylindrical pressure vessel or fusion chamber 10 having therein an annular stainless steel liner 11 forming therebetween a space, annulus, or cavity 12. A fuel pellet injector and vortex generator, not shown but similar to FIG. 1, is attached to the top of vessel 10 while a laser transport tube and vacuum pump ports 13 and 14 are mounted in the upper and lower ends of vessel 10. A mechanical transport mechanism 15, driven by means not shown, located at the lower end of vessel 10 forces ceramic-lithium balls or pellets 16 upward through space 12 and another mechanical transport mechanism 17, driven by means not shown, directs the balls 16 into vessel chamber 18 forming a blanket 19 of falling ceramic-lithium balls along the cylindrical wall surfaces of the vessel, these falling balls are collected at the bottom of chamber 18 and are recirculated by mechanism 15 as indicated at 16', the arrows indicating the course of circulation of the balls 16. The principal feature of the ceramic-lithium pellet waterfall (FIGS. 2 and 3) is a thick layer of falling solid ceramic-lithium pellets that shields the first structural wall from the microexplosion. The pellets are continuously recirculated to the top of the vacuum chamber through a reservoir region between the first wall and the pressure vessel. The pellets are either transported through heat exchangers, as in FIG. 1, or cooled by the flow of high-pressure helium gas in the reservoir region. Tritium is bred in the ceramic lithium compound and recovered as it diffuses out. Preliminary calculations indicate a tritium breeding ratio greater than 1 can easily be achieved.

The thick region of falling pellets will moderate and absorb neutrons before they reach the first structural wall, and this will result in a significant reduction in the degree of first-wall damage and possibly the amount of radioactive waste produced by neutron activation. The use of lithium in a ceramic form is an important feature of this concept in that it eliminates the corrosive problems of liquid lithium and significantly reduces the associated chemical hazard.

Major questions, such as tritium diffusion from the pellets and structural integrity of the ceramic compound, cannot be answered satisfactorily with existing data. More information may be forthcoming from the University of Wisconsin study, which uses $Li_2O$ as a blanket and heat-transport material (see R. W. Conn et al, "Studies of the Technological Problems of Laser Driven Fusion Reactors, Annual Report-I", University of Wisconsin, Report UWFDM-190, December 1976). A means of most efficiently transporting the pellets, particularly into and out of the vacuum chamber, is another area of required development, but within the current state of the art.

The liquid lithium "waterfall" concept (FIGS. 1, 4 and 5) has emerged as an extremely promising reactor concept for a laser-fusion power plant. It features a thick continuous fall of liquid lithium that protects the first structural wall, allowing it to last for the useful life of the plant. Besides moderating neutrons the fall (waterfall) also absorbs the photons (x-rays and reflected laser light), pellet debris (alpha particles, unburnt fuel, and other pellet material) and any shock wave emitted by the microexplosion. By keeping the fall off of the chamber wall this shock wave is not directly transmitted to the structural wall. The majority of the fusion energy is thus deposited in the liquid lithium, which also serves as the primary coolant and fertile material for tritium breeding.

Figure 4:
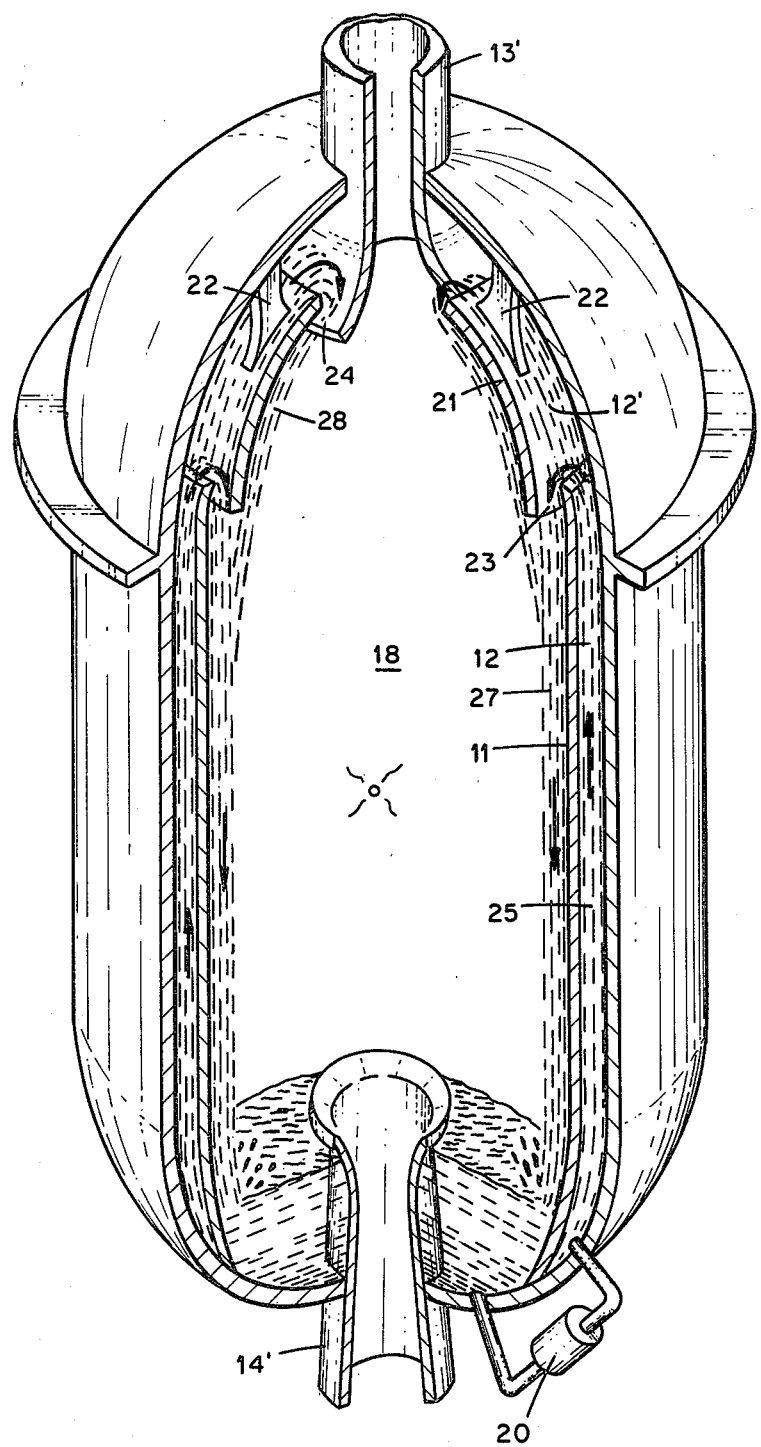
FIGS. 4 and 5 illustrate another embodiment of a fusion chamber incorporating a liquid lithium blanket waterfall.
Figure 5:
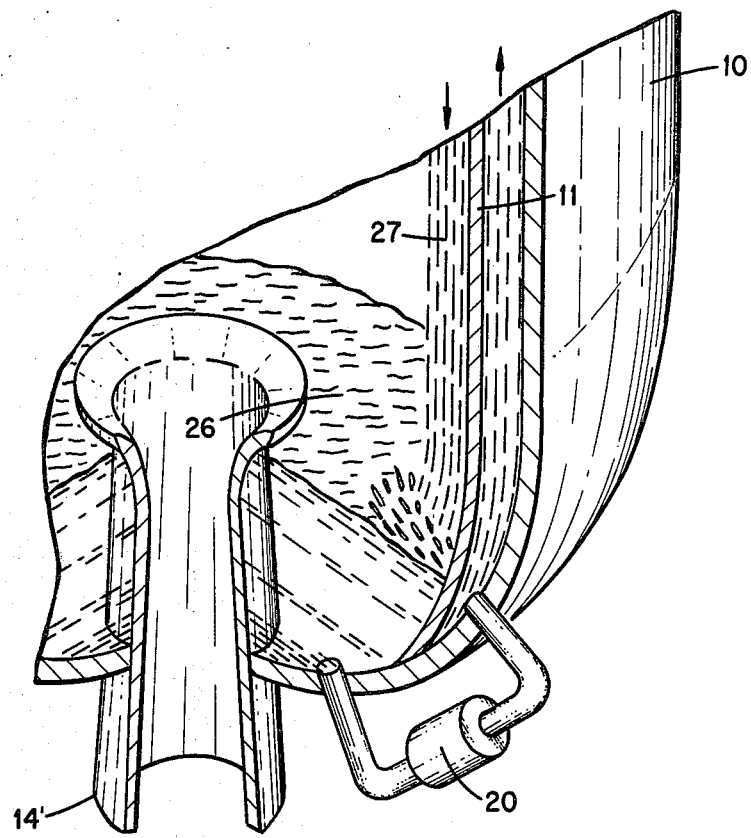

The embodiment of the liquid lithium "waterfall" illustrated in FIGS. 4 and 5 is generally similar to that of the ceramic-lithium ball embodiment of FIGS. 2 and 3 and are given similar reference numerals. The mechanical transport mechanism at the bottom of the vessel in FIG. 2 is replaced with a plurality of recirculation pumps 20 (only one shown), with the upper transport mechanism omitted. Also, the space or cavity 12 is extended to the top of vessel 10 as indicated at 12' by another stainless steel liner 21 supported by members 22 which is separated from liner 11 to form a first annular opening 23, and spaced from fuel pellet injection and vortex generating mechanism, not shown, but attached to laser transport tube 13', to form a second annular opening 24. As illustrated by the arrows, the liquid lithium, indicated at 25 in a reservoir 26 (see FIG. 5), is recirculated by pump 20 upward through spaces 11 and 11' which forms a "waterfall" or blanket 27 of falling liquid lithium along the wall of the vessel and a thin sheet 28 of lithium from the top of the vessel 10, as described hereinafter.

It should be pointed out that fluids other than liquid lithium could be used to perform the neutron moderating function of the fall (waterfall). The primary constraints on the fall material are that the substance must:

1. Have a reasonably low melting point (less than about 200° C.) so the fluid state can be effectively maintained.
2. Have a low enough vapor pressure at the selected operating temperature (>400° C. but as high as possible) to permit an adequate vacuum condition to be maintained.
3. Have neutronic characteristics that permit an adequate tritium breeding ratio to be achieved.

Tritium breeding considerations preclude the use of a neutron absorber and require that lithium be incorporated in the reactor system in a suitable manner.

One possibility is to use lead, which effectively degrades the high-energy neutron spectrum through (n, 2n) and inelastic scatterings, as the primary constituent of the fall. A few volume percent of $^6$Li in the Pb fall would be enough to maintain a tritium breeding ratio greater than 1. Alternatively, a small vol. % of lead could be added to the lithium fall to moderate more efficiently the neutron spectrum. The use of Pb-Li alloys would allow a lower system tritium inventory to be maintained. On the negative side, recirculation pumping power would increase and grain boundary corrosion of steels may present compatibility problems. The various aspects of such a system are being investigated. For the present, however, the discussion will be confined to a natural liquid lithium fall.

Laser fusion reactors have a flexibility of geometry that is not available in magnetic confinement reactors. While a point source of energy is more effectively utilized in spherical geometry, we have selected a cylindrical geometry for several reasons. A vortex generator (see FIG. 1) injects a sheet of lithium (similar to sheet 28 in FIG. 4) to protect the top of the reactor (primarily from x-rays and debris). This sheet is thinner than the waterfall (see FIG. 4) and does not provide the same degree of protection from neutron damage. Therefore, it is advantageous to have the top of the chamber farther from the microexplosion than are the sidewalls. The spherical end cap on the cylindrical chamber effectively accomplishes this. At the bottom of the vacuum vessel the lithium is in direct contact with the chamber walls. Thus, shock wave can be transmitted directly to the structural components at this point. By moving the bottom region farther away and decreasing the surface area of the lithium pool at the bottom, the magnitude of this effect is reduced. Also, as will be discussed, the fall must be injected downward thus forming a cylindrical sheet.

The tips of the laser beam tubes (see FIG. 1) must penetrate the waterfall and be directly exposed to the microexplosion at a distance equal to about ½ the chamber wall radius. Fortunately, these high damage areas represent only a minute fraction of the total surface area (a few hundredths of a percent) and sophisticated measures and/or special materials could be used to protect them. Alternatively, sacrificial tube ends could be used and remotely fed inward as the tips slowly vaporize.

As previously stated, the fall will contain enough lithium to significantly degrade the neutron spectrum. Neutron damage levels in structural materials can thus be reduced by more than an order of magnitude which will permit structural members to survive for the life of the plant at first wall loadings greater than 1 MW/m$^2$. (Wall loading will be consistently quoted here as the neutron energy flux at the first structural wall as if the fusion neutrons were only attenuated geometrically and not by any other material such as Li).

Figure 6:
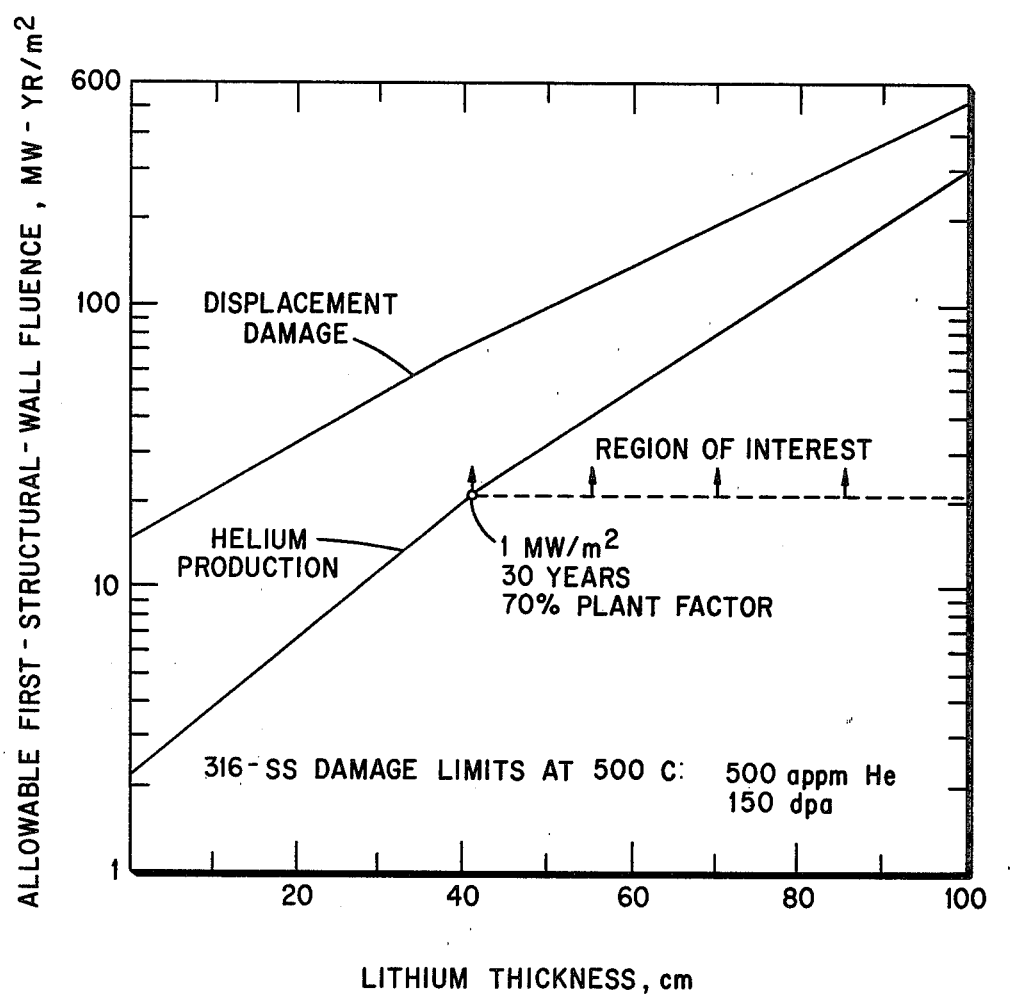
FIG. 6 graphically illustrates how allowable first wall fluence increases exponentially with lithium thickness.

The primary neutron damage mechanisms are atomic displacements and gas production (primarily helium). Displacement damage is expressed as displacements per atom (dpa) and gas production is expressed as atom-parts-per-million (appm). The damage limits for 316-SS (stainless steel) at an operating temperature of 500° C. are estimated to be 150 dpa and 500 appm helium. For an unprotected first wall of 316-SS, the displacement damage rate is ~10 dpa per full power year, and the helium production rate is ~220 appm per full power year at a neutronic wall loading of 1 MW/m$^2$. The damage limits for He production would thus be reached in only 2.3 years at this wall loading. As seen in FIG. 6, the allowable first-wall fluence increases exponentially with lithium thickness. Note that 40 cm of lithium is required to reduce helium production to the point where the first structural wall could last for 30 years at 1 MW/m$^2$ (at 70% capacity factor). Displacement damage is less restrictive.

We have selected a minimum thickness of 50 cm for our reference design but are considering even larger thicknesses. We have also taken advantage of the fact that the emitted 14 MeV neutrons are attenuated by compressed DT fuel; an advantageous effect unique to inertial confinement fusion. A compressed density-radius product ($\rho R$) equal to 3.0 was assumed. In FIG. 6, 50 cm of Li plus the compressed target is roughly equivalent to 63 cm of lithium. This gives an allowable fluence of 60 MW-YR/m$^2$ or about 3.0 MW/m$^2$ for the 30-year plant life at 70% capacity factor.

Figure 7:
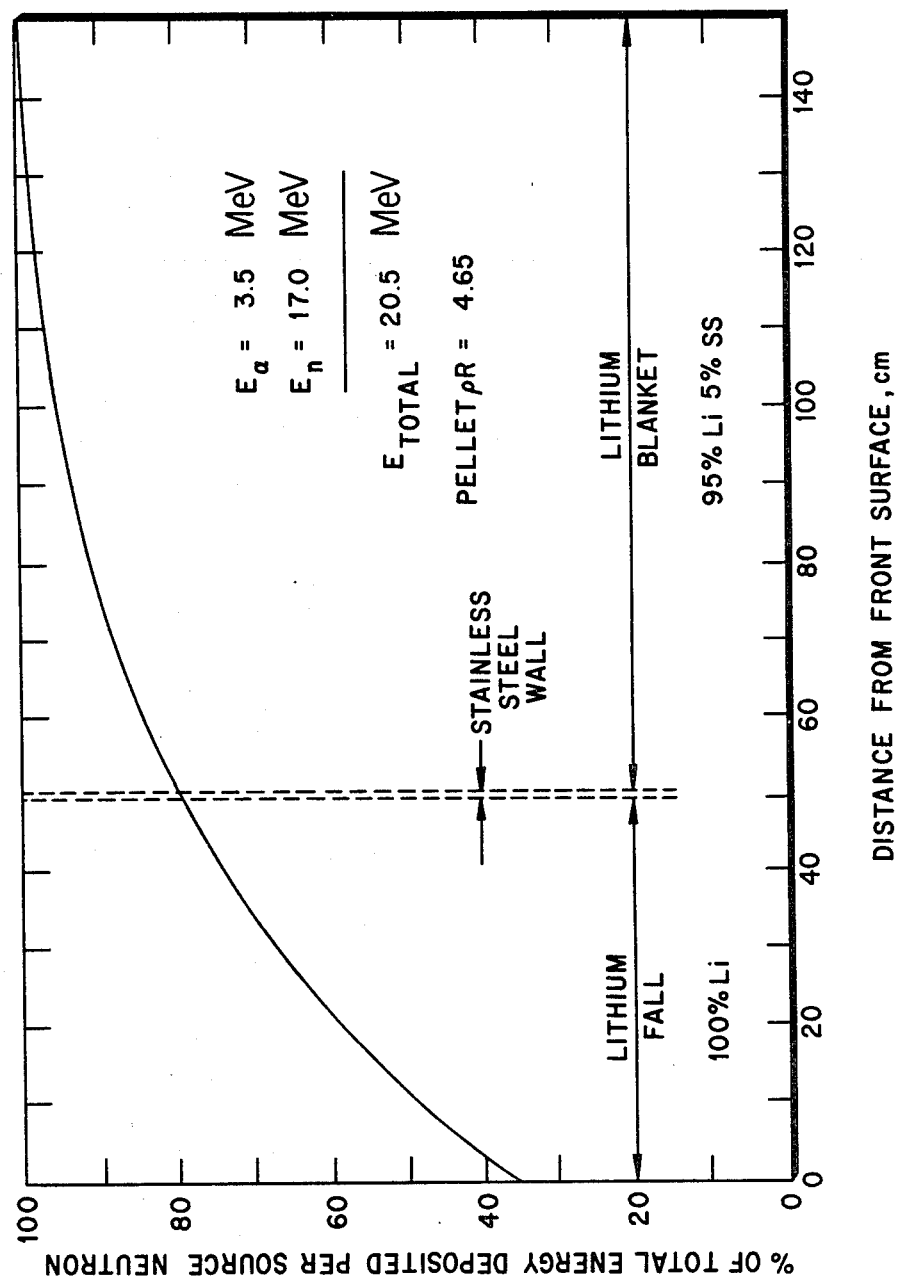
FIG. 7 graphically illustrates cumulative energy deposition.

In the process of attenuating neutrons and interacting with the microexplosion plasma the lithium fall absorbs a large fraction of the total nuclear energy deposited in the reactor. FIG. 7 presents the cumulative energy deposition through the lithium fall, and blanket region as a function of the fraction of the total energy deposited.

Again a compressed pellet $\rho R$ of 3.0 has been assumed resulting in a neutron energy deposition of ~2 MeV in the pellet itself. This along with the 3.5 MeV alpha energy accounts for 32% of the total energy deposited. All of this energy, whether in the form of x-rays, alpha particles, or other energetic debris will be deposited essentially at the surface of the lithium fall.

The compressed target also has an advantage in terms of neutron energy multiplication. The high-energy fusion neutrons undergo (n, 2n) reactions with both D and T resulting in an increase of about 10% in the neutron population through a mean-free-path of DT. The multiplied lower energy neutron spectrum results in a larger number of exoergic $^6$Li(n,$\alpha$)T reactions and a smaller number of endoergic $^7$Li(n, n'$\alpha$)T reactions than a 14 MeV neutron spectrum would. A total of 17.0 MeV of energy (per fusion reactions) is deposited in the system as a result of neutron interaction with the DT and blanket materials. This deposit represents a neutron energy multiplication factor of 1.2 compared to about 1.1 for the 14 MeV source.

The total energy deposited in the reactor is 20.5 MeV per fusion reaction. As indicated, 80% of this energy is deposited in the 50-cm-thick lithium fall. Because lithium is the primary coolant, the system does not have to rely on conduction of heat through structural materials to remove the reactor energy. Lithium is in fact an excellent coolant with a specific heat capacity equal to that of water and three times better than that of sodium. In addition, its low density of 0.5 g/cm$^3$ is advantageous in terms of pumping power considerations. A major advantage of absorbing all the plasma energy and much of the neutron energy is that the cyclical thermal stresses in the structural walls are essentially eliminated.

An alternative scheme proposed for the liquid lithium waterfall would be to make the fall thick enough (>80 cm) to absorb over 90% of the total energy (see H. I. Avii et al, "The Effects of a Liquid ISSEC on Radiation Damage Parameters in Laser Fusion First Walls", University of Wisconsin, Report UWFDM, April 1977). In this way the recirculating reservoir region would not be required for tritium breeding or energy removal and the structural first wall could be independently cooled at a lower temperature. A decrease in the wall temperature would significantly relax radiation damage limits for dpa and appm He. The first wall could then be operated at a higher wall loading and thus increase the power density of the reactor system. Naturally, the higher the power density the smaller the reactor vessel size will be for a given power system, thereby reducing the capital cost of the reactor.

As on might suspect, the liquid lithium waterfall concept has excellent tritium breeding characteristics. With no structural material between the fusion neutrons and the lithium fall, the design takes full advantage of the high-energy $^7Li(n,n'T)$ reaction. Table I shows the distribution of tritium breeding from $^6Li$ and $^7Li$ reactions in a 50-cm lithium fall and recirculating lithium blanket region. A one-dimensional spherical model was used in these Monte Carlo calculations.

TABLE I

| TRITIUM BREEDING PERFORMANCE | |
|---|---|
| Lithium fall | $T_6 = 0.44$ |
|  | $T_7 = 0.56$ |
|  | $T_{FALL} = 1.00$ |
| Recirculating lithium | $T_6 = 0.62$ |
| region | $T_7 = 0.11$ |
|  | $T_{RECIRC} = 0.73$ |
|  | $T_{TOTAL} = 1.73$ |

● 50 cm natural lithium fall
● 100 cm natural lithium recirculating region
● Target $\rho R = 3.0$ gm/cm$^2$ A compressed target $\rho R$ of 3.0 gm/cm$^2$ was assumed. A tritium breeding ratio of 1.0 is obtained in the fall alone, and the total tritium breeding ratio is 1.7. The excess tritium produced in this reactor could in fact supply fuel for other laser fusion applications where tritium breeding is difficult or impractical. Two examples of such applications are radiolytic hydrogen production where it is desirable to deposit the neutron energy in stream rather than lithium blankets and propulsion applications where weight and volume considerations are extremely important.

Figure 8:
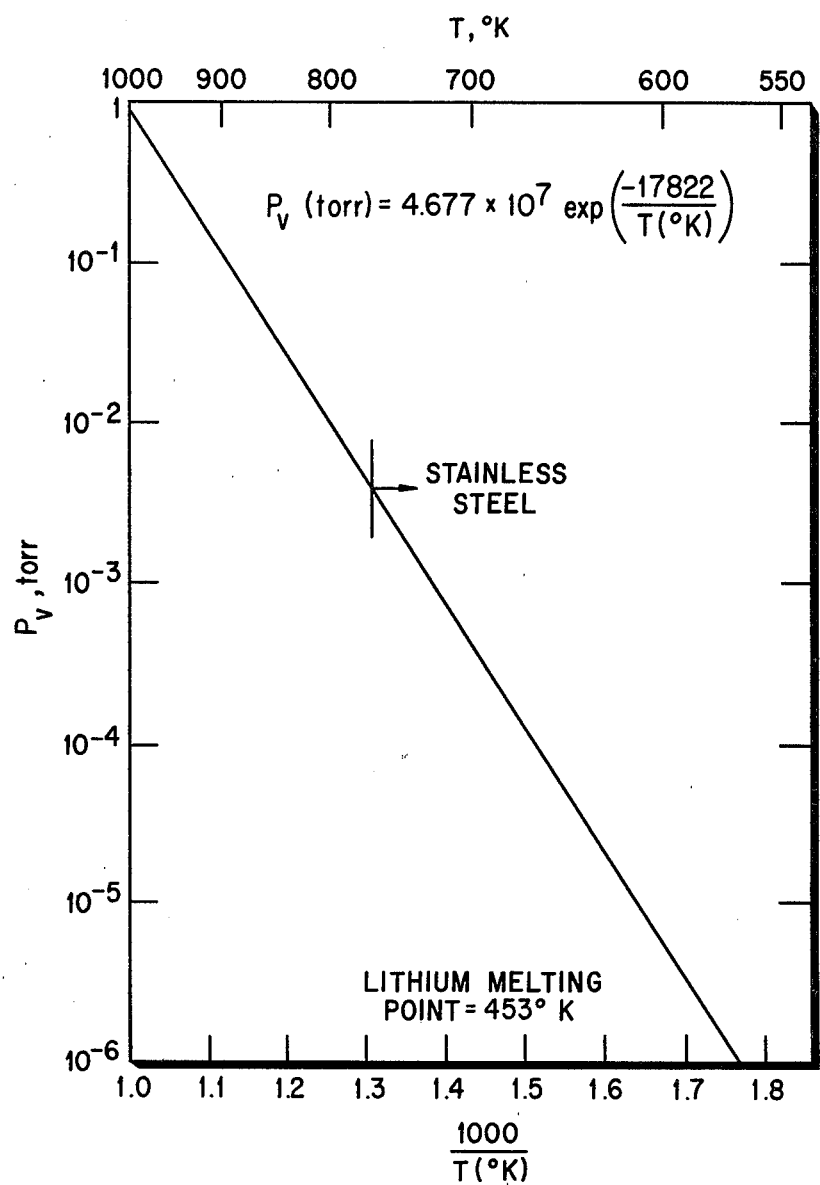
FIG. 8 illustrates lithium vapor pressure vs. temperature.

As previously stated, the vacuum condition required for laser beam propagation is on the order of 0.1 torr. FIG. 8 shows that the vapor pressure of lithium is orders of magnitude less than 0.1 torr at reasonably high temperatures. Corrosion considerations require that, for use with stainless steel, lithium temperatures must be limited to less than 500° C. The vapor pressure at this temperature is less than $5 \times 10^{-3}$ torr.

Each microexplosion will vaporize a certain amount of lithium thus increasing the chamber pressure above the required 0.1-torr vacuum condition. The amount of lithium vaporized and the resulting chamber pressure will depend on the initial system conditions and in what way the fusion energy could conceivably be used to heat liquid lithium, vaporize lithium, and heat lithium vapor. If the chamber pressure equals the liquid vapor pressure prior to the microexplosion, even deposited neutron energy could vaporize lithium. The debris and x-ray energy, which is deposited over a very short range at the fluid surface, is expected to effectively blow off lithium vapor.

After the initial transient events, a certain amount of lithium vapor will exist in the chamber. The resulting quasi-equilibrium pressure will most certainly be higher than the required vacuum condition of 0.1 torr and must therefore be reduced prior to the next microexplosion. There is so much liquid lithium in the chamber at the time of the microexplosion that the mixed-mean temperature rise of the fall per pulse is quite small. The vapor will therefore be in a supersaturated or superheated condition and proceed to recondense on the liquid lithium in the chamber. In effect, the liquid lithium waterfall acts as a condensing vacuum pump for the chamber.

The effectiveness of the lithium liquid in condensing the vaporized lithium will depend on the condition of the fall (bulk temperature, surface temperature, whether or not it is disassembled) and on the condition of the vapor (temperature, pressure) shortly after the microexplosion. The liquid fall conditions are important for determining the vapor pressure of the liquid and the sticking coefficient, defined as the probability that a gas molecule incident on the liquid surface will stick. If the sticking coefficient is great than ~0.5 (which is almost certainly the case for a liquid metal) the vaporized lithium will be driven by a pressure gradient to the condensing liquid surface at the local sonic velocity. Assuming adiabatic, frictionless flow of an ideal monatomic gas, the pressure decays according to $$\frac{P}{P_0} = \left[ \left( \frac{8.33 \, AS \sqrt{T}}{V} \right) t + 1 \right]^{-5}$$

where
A = condensing surface area, m$^2$
S = sticking coefficient
T = vapor temperature, °K.
V = vacuum chamber volume, m$^3$
t = time, sec
$P_0$ is the quasi-equilibrium pressure immediately after the microexplosion but before recondensation begins.

Figure 9:
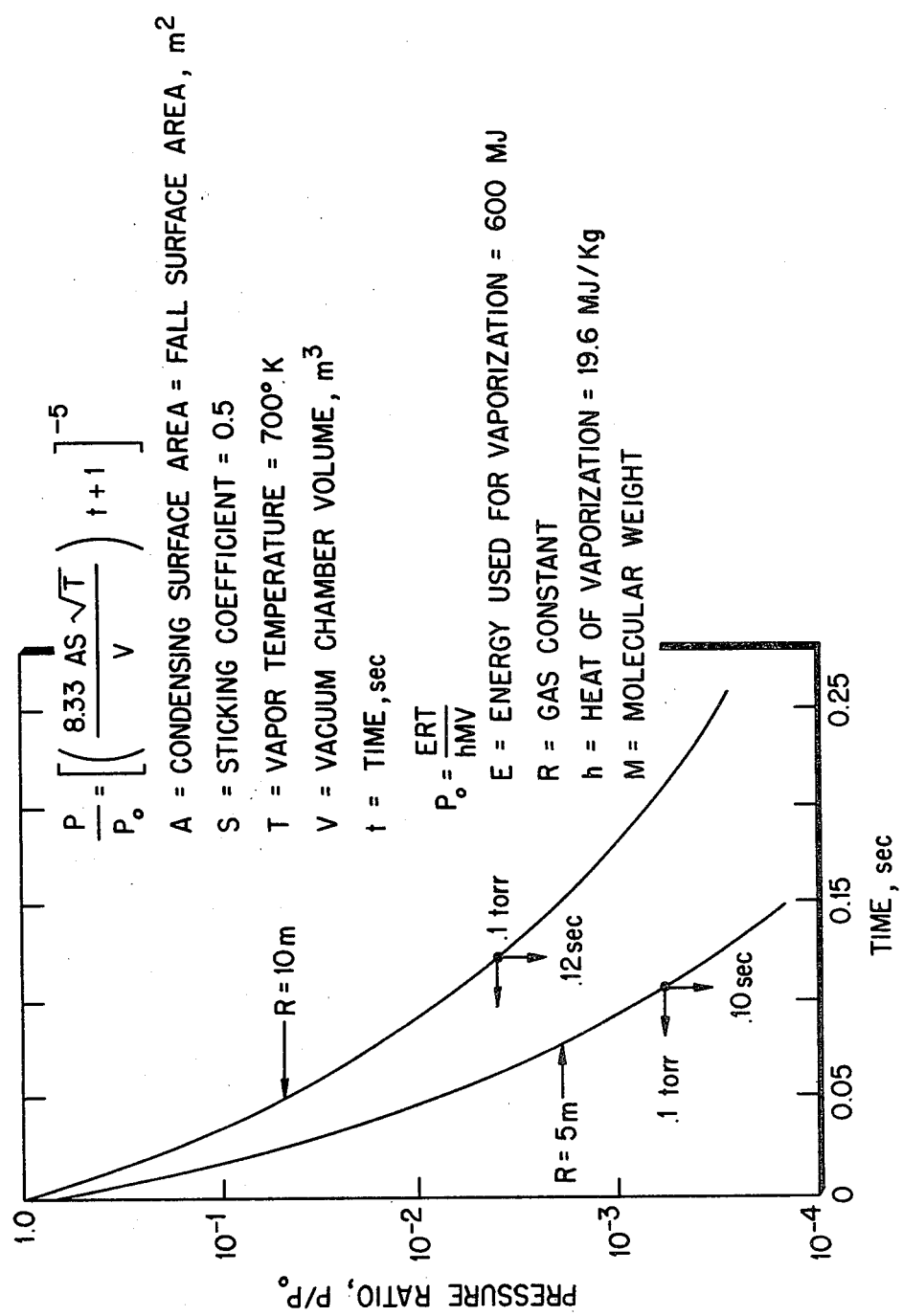
FIG. 9 illustrates graphically pressure decay as vaporized lithium is recondensed by the fall.

FIG. 9 shows the pressure decay as vaporized lithium is recondensed by the fall. These curves represent worst-case calculations in which all the fusion energy (600 MJ per microexplosion) is used to vaporize lithium at 700° K. While an increase in vapor temperature would result in a higher value of $P_0$, the sonic velocity of the gas would also be higher and the gas would condense more quickly. The sticking coefficient of 0.5 is pessimistically low for a liquid metal vapor. Also, if the fall is disassembled by the neutron energy deposition, the condensing surface area will be much larger than the original surface area of the fall assumed here.

Even with these assumptions, the vacuum conditions return to the required 0.1 torr in ~0.1 sec for the 5-m chamber and in ~0.12 sec for the 10-m chamber. Flow considerations will limit operation to a pulse repetition rate of a few times per second. Thus while the exact time-dependent chamber conditions have not been determined, this analysis indicates that vacuum conditions can be maintained and are in fact aided by the presence of the liquid lithium fall.

We now turn attention to what is required in terms of pumping power and flow rates to maintain the thick fluidized wall of lithium.

Figure 10:
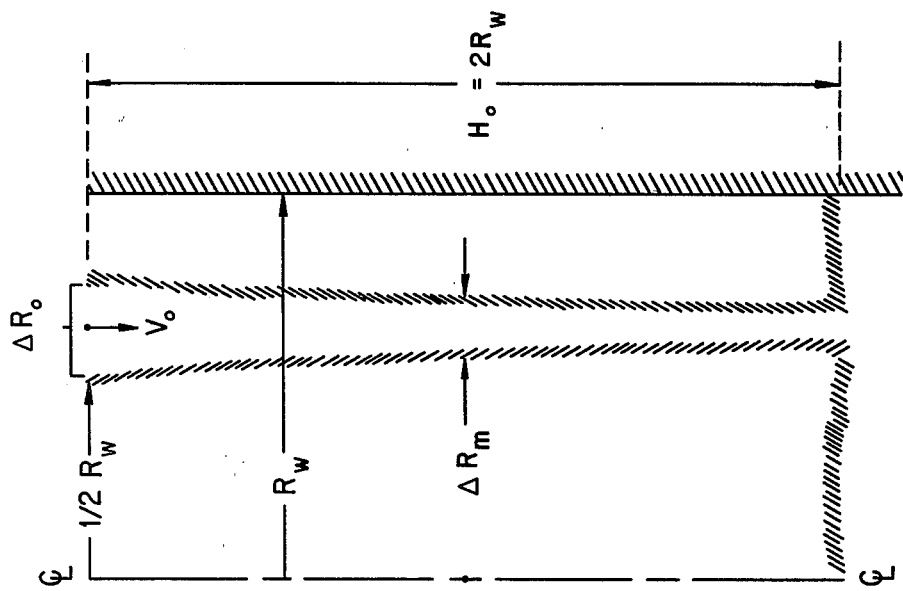
FIG. 10 illustrates recirculation pumping power of a single fall.

FIG. 10 shows the model and constraints used to calculate the pumping power required to recirculate the lithium fall. The fall protects the cylindrical portion of the chamber wall, which has a height-to-diameter ratio of 1. The flow inlet forms an annulus of thickness $\Delta R_0$ with the inner edge of the ring at one-half the chamber wall radius $R_w$. The fall is injected vertically downward with an inlet velocity $V_0$. The pumping power is then estimated on the basis of the kinetic and static head requirements.

$$P.P. = (\tfrac{1}{2}V_0^2 + gH_0)\rho V_0 A_0$$

where:
$H_0$ = fall height = $2R_w$ $A_0$ = inlet flow area = $\pi[(\tfrac{1}{2}R_w + \Delta R_0)^2 - (\tfrac{1}{2}R_w)^2]$.

Preliminary calculations indicate that the fall will be disassembled by the microexplosion. If this is the case, the inlet velocity must be sufficient to allow the fall to reestablish itself prior to the next microexplosion. A clearing ratio of unity should be adequate. The first constraint is therefore:

$$H_0 = 2R_w \leq V_0\tau + \tfrac{1}{2}g\tau^2,$$

$1/\tau$ = pulse repetition rate.

As previously noted, 50 cm of lithium is thick enough to provide adequate protection to the first structural wall up to 3.0 MW/m². The second constraint is therefore that source neutrons must be attenuated by at least 50 cm of lithium at any point through the fall. Flow continuity requires that the thickness of the fall decrease as the fluid is accelerated by gravity. The minimum path length for neutrons actually occurs slightly below the horizontal midplane, but it is a very shallow minimum. The constraint on minimum effective thickness has, therefore, been taken at the midplane to simplify the calculations. The second constraint is:

$$\Delta R_m \geq 50 \text{ cm}.$$

The third constraint is that the inlet thickness must be less than one-half the chamber wall radius. This is a constraint of our selected geometry.

$$\Delta R_0 \leq \tfrac{1}{2}R_w$$

For small chambers the clearing ratio constraint is less important than the midplane thickness and total inlet thickness constraints. For example, a 3-m radius chamber requires an inlet velocity of only ~1 m/sec. At this velocity, however, the midplane thickness is only 13% of the inlet thickness which would thus have to be over 3.8 m thick to provide 50 cm of protection at the midplane. Because this is larger than ½ the chamber radius, a higher inlet velocity must be used in calculating the pumping power.

Figure 11:
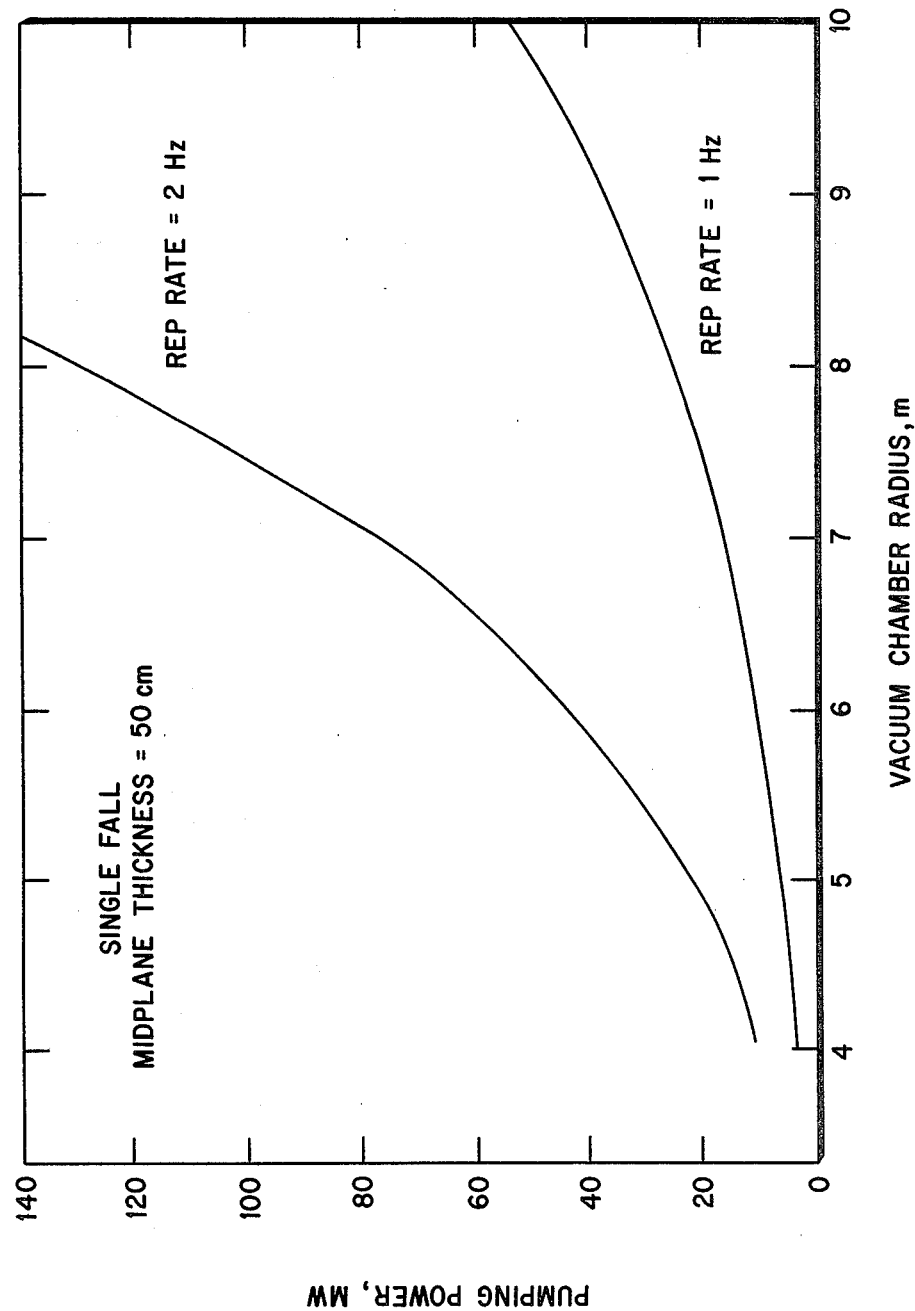
FIG. 11 graphically shows pumping power required to recirculate a liquid lithium "waterfall" for a single fall.

The pumping power required to recirculate the liquid lithium waterfall is given in FIG. 11 as a function of vacuum chamber radius. (The gross power at pulse repetition rates of 1 Hz and 2 Hz is ~270 MW$_e$ and 540 MW$_e$ for a pellet gain, Q=600, respectively). As indicated, at 1 Hz the pumping power is less than 5 percent of the gross power up to a chamber radius of ~7 m. At the higher repetition rate the inlet velocity required to cover the length of the chamber in the ½ second between microexplosions is quite large. In this case, the fraction of the gross power used becomes substantial and, in fact, prohibitive for large chambers.

The use of liquid lead with a low concentration of Li results in an increase in the pumping power due to the ~20-fold increase in density. Lower thickness requirements with the Pb-Li alloy somewhat reduce this disadvantage. Depending on the specific case, pumping powers are thus a factor of 5-10 greater.

The possible advantages of using multiple falls (waterfalls) entering the chamber at different vertical positions have also been considered. The primary advantage would be a reduction in the velocity head required to obtain a clearing ratio of 1. Each fall would be required to reestablish only to the inlet of the next lower fall. This is especially important at higher repetition rates. A second advantage is that the static head requirement is reduced for the fraction of the flow delivered to the lower falls. Also, if the injected fall should tend to break up into separate streams instead of forming a continuous curtain, additional lower falls could replenish the primary fall.

A similar calculation model was used for a system with two falls, one inletting at the top of the wall surface as before and one at the midplane of the wall surface. The constraints on the fall are the same as for the single-fall case, with the actual positions of minimum effective thickness used to determine the required inlet thicknesses. As before, the inlet thickness (now equal to the sum of $\Delta R_{10}$ and $\Delta R_{20}$) must be less than ½ $R_w$.

Figure 12:
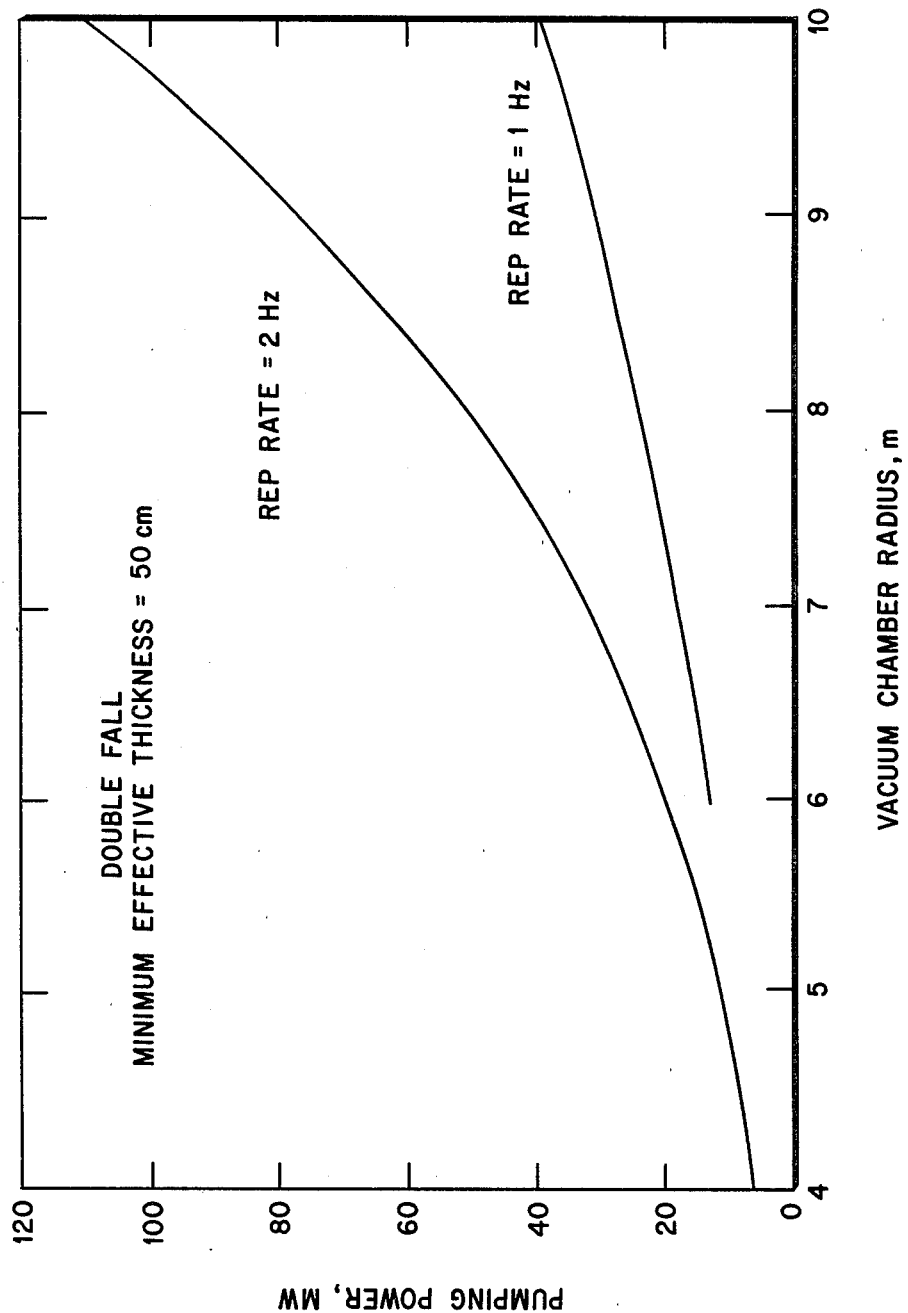
FIG. 12 shows graphically pumping power required to recirculate a liquid lithium "waterfall" for a double fall.

The pumping power required to recirculate the double fall is shown in FIG. 12. Note particularly the substantial reduction in pumping power for the larger chambers at 2 Hz (50 MW$_e$ compared to 130 MW$_e$ for the 8 m chamber). The advantages of reduced velocity and static heads have been offset by larger flow area requirements for the smaller chambers at a repetition rate of 1 Hz.

It is pointed out that the double-fall geometry is not by any means optimal. It is presented only to illustrate the possible advantages of multiple falls. Also note that a theoretical pumping power has been calculated that does not include the efficiency of the pump or drive motor. These factors will depend on the specific design, but for large axial flow pumps the combined efficiency could be ~80%.

The above evaluation of the fluidized wall, and particularly the liquid lithium waterfall approach of this invention has shown that the protection afforded by the thick fluidized curtain of lithium will allow first-wall and blanket structures to retain their integrity for the life of the system. Since the lithium waterfall preferably stands away from the first-wall a certain distance, the shock in the waterfall material which is initiated by the target debris striking said material will not be directly transmitted to the first-wall. The use of a waterfall reduces the neutron damage to the exposed structures to the point where the target or fusion chamber will have a life of ~30 years for wall loadings ≳3 Megawatt/m², where by contrast, an unprotected structure of stainless steel will last only about 3 years at a loading of 1 Megawatt/m².

Thus, with existing technology, the present invention provides an effective means for protection of the first or inner wall of inertial confinement fusion chambers from the microexplosion debris, x-rays, neutrons, etc. produced by the implosion of fusion fuel targets within such chamber. With the technology to protect the chamber, as provided by the present invention, efforts for the development of an overall inertial fusion power plant has been substantially advanced by the use of a blanket which involves a fluidized wall, particularly in the form of a lithium waterfall of either liquid lithium, along or with selected additives, or solid pellets of ceramic-lithium.

The present invention thus provides a fluidized wall of at least lithium (liquid or solid pellets) within a target or fusion chamber of an inertial confinement system which: (1) protects the exposed first wall from the microexplosion products, (2) moderates the neutrons kinetic energy and converts it to useful thermal energy, and (3) provide a source of tritium, which is bred by reaction of neutrons with the lithium.

While use of the present invention in a fusion power plant will be in the near future, the invention has utility in its use in the production of high-energy neutrons, x-rays, etc., for currently known applications, such as in the field of neutron crystallography, means of achieving crystal dislocations, initiation of some action such as a switch or random number generator upon receipt of a neutron pulse by a detector, calibration of diagnostics for other apparatus, fluor studies and as a source of strong shock waves for high pressure testing.

While particular embodiments of the invention have been illustrated or described, modifications will become apparent to those skilled in the art, and it is intended to cover in the appended claims all such modifications that come within the spirit and scope of the invention.

What we claim is:

1. A method for protecting the inner wall of an inertial confinement fusion chamber from damage by X-rays, neutrons, and debris generated by the implosion of fusion fuel targets in the chamber, comprising the steps of: forming the inner wall of the chamber so as to include an upright cylindrical section, forming an annulus about the exterior of substantially the entire upright cylindrical section of the inner wall, forming at least one annular opening adjacent an upper portion of the upright cylindrical section of the inner wall and in open communication with the annulus, forming a flowing wall of selected material in liquid form which flows along an inner wall surface of substantially the entire upright cylindrical section of the fusion chamber by directing the material through the annulus and through the at least one annular opening in the inner wall, recirculating at least a portion of the material from a lower portion of the fusion chamber upwardly through the annulus and inwardly through the at least one annular opening so as to produce a waterfall effect forming the flowing wall and to maintain a continuous flowing wall which substantially prevents generated X-rays, neutrons and debris from contacting the wall surface of the fusion chamber, forming a second annulus about the exterior of an upper section of the fusion chamber above the upright cylindrical section thereof and in open communication with the first-mentioned annulus, providing at least one annular opening adjacent an upper end of the fusion chamber between the second annulus and the interior of the fusion chamber, and forming a thin sheet of the selected material which flows from the upper end of said fusion chamber downwardly along the inner wall surface of the upper section of the fusion chamber above the upright cylindrical section thereof and mixes with the flowing wall by directing the material upwardly through the second annulus and inwardly through the at least one annular opening located adjacent the upper end of the fusion chamber.

2. The method defined in claim 1, additionally including the step of forming the selected material from the group consisting of liquid lithium and liquid lithium-lead mixture.

3. The method defined in claim 1, additionally including the step of forming the selected material from materials that have a melting temperature of less than about 200° C. to effectively maintain the fluid state thereof, have a sufficiently low vapor pressure to maintain an adequate vacuum at operating temperatures ($>400°$ C.), and have neutronic characteristics that permit an adequate tritium breeding ratio to be achieved.

4. The method defined in claim 1, wherein the step of recirculating the material is carried out by material transport mechanisms.

5. The method defined in claim 1, wherein the step of recirculating the material is carried out by at least one recirculation pump.

6. In an inertial confinement reactor having a vessel which includes a first wall having an inner surface forming a chamber therein and provided with target injection means, and means for imploding targets injected into the chamber, the improvement comprising: means defining an annulus exterior of and extending about a portion of said first wall, said first wall including an upright cylindrical section and an annular upper portion located above said upright cylindrical section and separate therefrom, said annulus extending around substantially the entire upright cylindrical section of said chamber, said upright cylindrical section having an annular opening located adjacent an upper portion of said upright cylindrical section of said chamber providing open communication between said chamber and said annulus, said upper annular portion having an annular opening into said chamber, means for protecting the inner surface of said first wall defining said upright cylindrical section of said chamber by forming a flowing wall of material which flows along the inner surface of substantially the entire upright cylindrical section of said chamber, means for recirculating the material from a lower portion of said chamber upwardly through said annulus and inwardly through said at least one annular opening in said upper cylindrical section forming a waterfall effect and maintaining a continuous flowing wall of the material along said upright cylindrical section of said chamber toward said lower portion of said chamber, means for directing a portion of said material to said annular opening in said upper portion for forming a thin sheet of said material which flows downwardly along substantially the entire inner surface of said annular upper portion of said first wall above said upright cylindrical section and mixes with said flowing wall.

7. In an inertial confinement system having a vessel which includes a first wall having an inner surface forming a chamber therein and provided with target injection means, and means for imploding targets injected into the chamber, the improvement comprising: means defining an annulus exterior of and extending about a portion of said first wall, said chamber including an upright cylindrical section, said annulus extending around substantially the entire upright cylindrical section of said chamber, said first wall having at least one annular opening located adjacent an upper portion of said upright cylindrical section of said chamber providing open communication between said chamber and said annulus, means for protecting the inner surface of said first wall defining said upright cylindrical section of said chamber by forming a flowing wall of material which flows along the inner surface of substantially the entire upright cylindrical section of said chamber, means for recirculating the material from a lower portion of said chamber upwardly through said annulus and inwardly through said at least one annular opening in said first wall forming a waterfall effect and maintaining a continuous flowing wall of the material toward said lower portion of said chamber, means for forming a second annulus exterior of said first wall and extending from and in open communication with said first-mentioned annulus to adjacent an upper portion of said chamber above said upright cylindrical section thereof and forming at least one annular opening into said upper portion of said chamber, said material recirculating means also directing material upwardly through said second annulus and inwardly through said at least one annular opening in said upper portion of said chamber forming a thin layer of said material which flows downwardly along said inner surface of said first wall forming said upper portion of said chamber above said upright cylindrical section into said flowing wall.

8. The improvement defined in claim 6 or 7, wherein said material is in liquid form, and wherein said material recirculating means comprises a recirculation pump.

9. The improvement defined in claims 6 or 7, wherein said material is selected from the group consisting of liquid lithium and liquid lithium-lead.

* * * * *